L. D. LAMKIN.
HAY RAKE.
APPLICATION FILED AUG. 11, 1906.
931,012.
Patented Aug. 10, 1909.
3 SHEETS—SHEET 1.
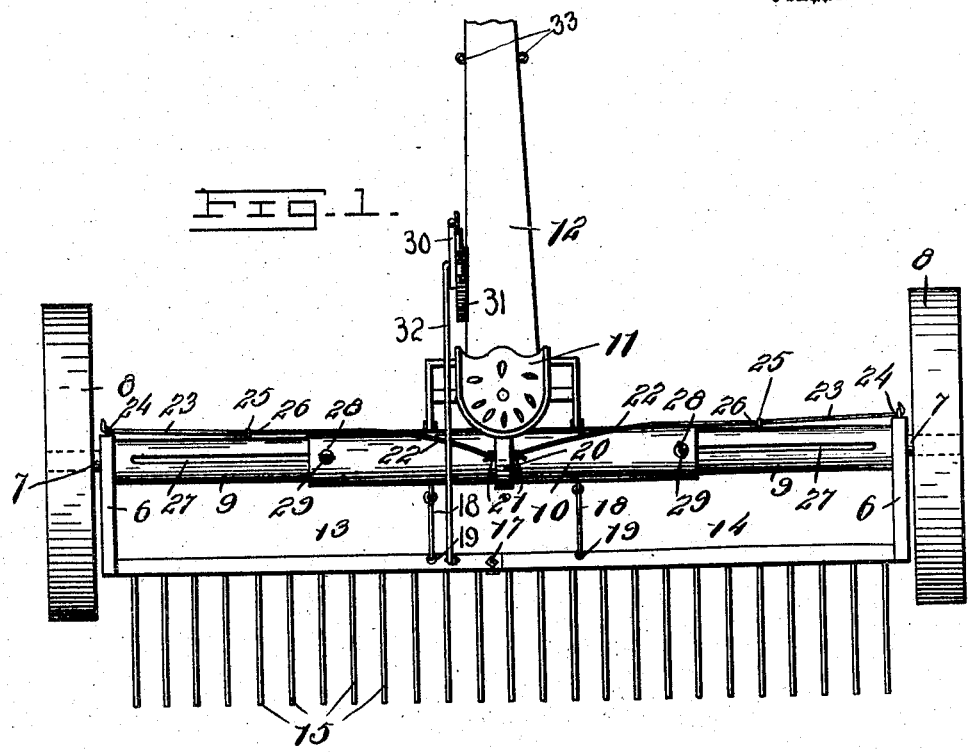
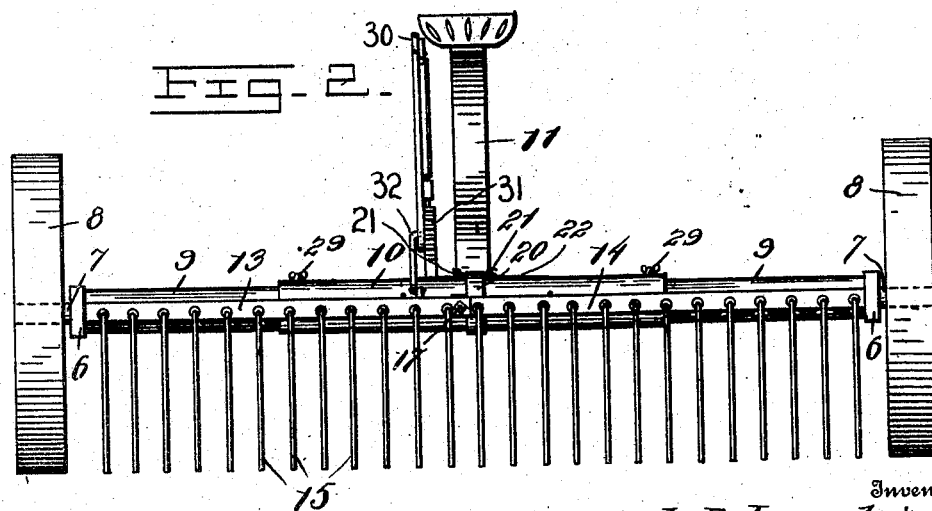

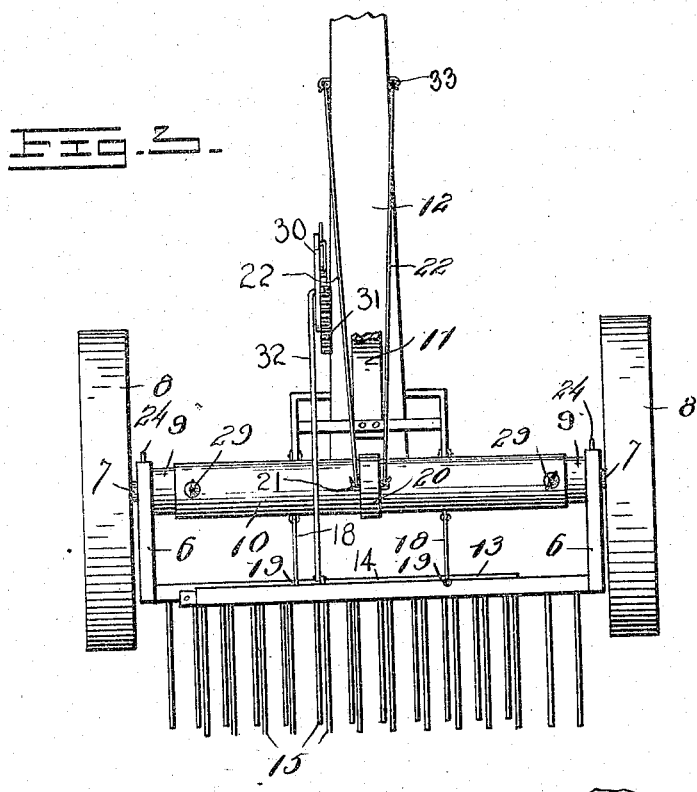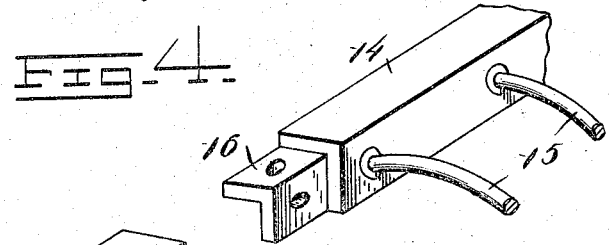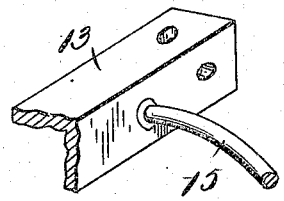

UNITED STATES PATENT OFFICE.

LONZO D. LAMKIN, OF GIBTOWN, TEXAS, ASSIGNOR TO HENRY A. SMITH, OF GURLEY, ALABAMA.

HAY-RAKE.

No. 931,012.   Specification of Letters Patent.   Patented Aug. 10, 1909.

Application filed August 11, 1906. Serial No. 330,204.

*To all whom it may concern:*

Be it known that I, LONZO D. LAMKIN, a citizen of the United States, residing at Gibtown, in the county of Jack and State of Texas, have invented certain new and useful Improvements in Hay-Rakes; and I do hereby declare the following to be a full, clear, and exact description of the invention, such as will enable others skilled in the art to which it appertains to make and use the same.

This invention relates to hay rakes and has for its primary object to provide a rake of this class which may be folded to permit travel of the same over roads, through narrow gates, and the like, and the invention contemplates a rake which may be quickly folded and easily reset to its proper width when desired.

A further feature of the invention resides in the provision of a novel form of sectional rake head which permits ready folding of the rake.

With the above and other objects in view the invention resides in the construction and arrangement of parts shown in the accompanying drawings.

Figure 5:
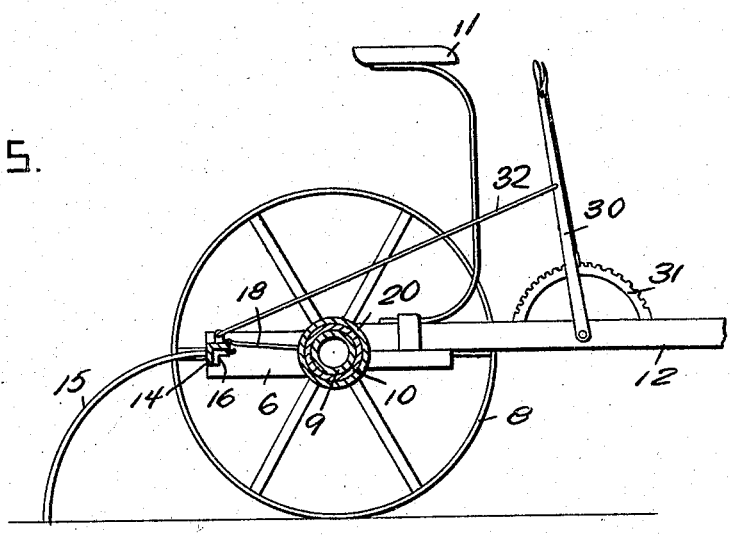
Figure 6:
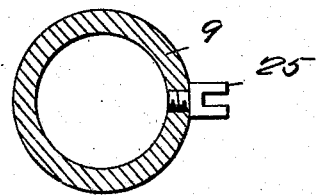

Figure 1 is a top plan view of the rake in extended position. Fig. 2 is a rear elevation of the rake in this position. Fig. 3 is a top plan view, the rake however being shown folded. Fig. 4 is a detail perspective view of the meeting ends of the rake head sections. Fig. 5 is a vertical sectional view through the rake, and, Fig. 6 is a detail sectional view through one of the cylindrical beams of the rake.

Referring more specifically to the drawings the implement is shown as comprising a frame including side sills 6 carrying each a spindle 7 for the mounting of a wheel 8. Extending inwardly from each of the side sills 6 is a cylindrical beam 9 and the said beams are adjustably engaged in a tubular beam 10 which is consequently located between the side sills 6 of the frame. This construction permits of adjustment of the sills to and from each other as will be readily understood and the purpose of this adjustment will be presently made obvious. A seat 11 is mounted upon the beam 10 and a tongue 12 is also connected therewith. Secured at their outer ends to the side sills 6 rearwardly of the beams 9 are rake head sections 13 and 14 carrying each a series of rake teeth 15 of the usual construction. The said rake head sections are of angle iron construction and the section 14 is thickened at its inner end and rabbeted at 16 for the engagement of the corresponding end of the section 13 therewith when the side sills are separated to the greatest degree, the said inner ends of the rake head sections being secured in this position by means of bolts 17. In order to support the rake head when thus connected, hooks 18 are carried by the tubular beam 10 and are engaged through openings 19 formed in the rake head sections adjacent their connected ends. A band 20 is secured upon the tubular beam 10 and is provided with spaced apertured ears 21 with which are loosely connected the inner ends of rods 22 which extend forwardly and laterally to the front of the beam and thence directly laterally as at 23 and are detachably connected at their outer ends to eye members 24 upon the side sills of the frame. Bifurcated guide blocks 25 are provided with stems 26 which are removably engaged in bores formed in the beams 9 and in the bifurcation of each block is engaged the laterally extending portion 23 of the corresponding rods 22, the function of the said block being to hold the rods 22 in proper position.

From the foregoing it will be seen that, it being desired to fold the rake, it is only necessary to disconnect the rake head sections, the rods 22 from the sills 6 and the hooks 18 from the side rake head sections, the blocks 25 being also removed. The sections may then be slid toward each other with the rake head sections overlapping as shown in Fig. 3.

In order that the rake may be held in folded position, each of the beams 9 is provided with a key receiving recess 27 which registers with an opening 28 formed through the tubular beam 10 for the engagement therein of a key 29.

A lever 30 is pivotally mounted upon the tongue 12, and coöperates with a segmental rack 31 on the said tongue and pivotally connected at one of its ends with the lever is one end of a rod 32 which is loosely connected at its opposite end with the rake head section 13, it being obvious that by this means, the rake may be raised and lowered. When the rake is in folded position, the outer ends of the rods 22 are engaged with the eye members 33 upon the tongue of the rake.

It is to be understood that I do not desire to be limited to the exact details of construction shown and described, for obvious modifications will occur to a person skilled in the art.

What is claimed is:

1. A rake of the class described comprising side sills, beams projecting inwardly from the side sills and toward each other, a tubular beam in which the first mentioned beams are telescopically received, means for holding the first mentioned beams in adjusted relation with respect to the tubular beam, a rake head comprising sections secured at their outer ends to the side sills and extending inwardly toward each other, teeth carried by the rake head sections, connections between the rake head sections and the tubular beam, and a bolt engaged through the meeting ends of the rake head sections whereby the same will be held in extended relation.

2. A rake of the class described comprising side sills, beams projecting inwardly from the side sills and toward each other, a tubular beam in which the first mentioned beams are telescopically received, means for holding the first mentioned beams in adjusted relation with respect to the tubular beam, a rake head comprising angle iron beam, a rake head comprising angle iron sections which are secured at their outer ends to the side sills and have their inner ends enlarged and rabbeted so as to fit together when the rake is extended, a bolt engaged through the rabbeted ends of the rake head sections, and teeth carried by the rake head sections.

3. In a rake, the combination with a support adjustable transversely to vary the width of the same, of a longitudinally adjustable rake carried by said support, and having slidably engaged sections.

4. In a rake, the combination with a wheeled support having slidably engaged sections or members whereby the support may be varied in width, of a longitudinally adjustable rake carried by said support and having slidably engaged sections.

5. In a rake, the combination with a main frame, of an axle carrying supporting wheels and having an extensible section, and a sectional rake having one member connected to the extensible section of the axle and slidably engaged with the other rake member.

6. In a rake, the combination with a main frame, of an axle having extensible sections carrying supporting wheels and a rake having slidably engaged extensible members connected to the extensible sections of the axle.

7. In a rake, the combination with a main frame, of an axle having a central section and end sections slidably engaged with the central section, supporting wheels upon said end sections, and an extensible rake having members connected to the end sections of the axle and slidably engaged with each other.

8. In a rake, the combination with a main frame, of an axle having a central section and extensible end sections, supporting wheels upon said end sections, an extensible rake having the inner ends of its sections slidably engaged and their outer ends connected to the end sections of the axle, and a detachable fastening uniting the overlapping inner ends of the rake sections.

9. In a rake, the combination with a main frame, of an axle having a tubular central section carried by the main frame and end sections telescopically engaged with the central section, supporting wheels upon the end sections of the axle, a rake having slidably engaged sections connected at their outer ends to the end sections of the axle and means for connecting the inner portions of the rake sections and the central section of the axle.

10. In a rake, the combination with a main frame, of an axle having a central section and extensible end sections, supporting wheels upon said end sections, an extensible rake having the inner ends of its sections slidably engaged and their outer ends connected to the end sections of the axle, and detachable fastenings uniting the inner portions of the rake sections to the central section of the axle.

In testimony whereof, I affix my signature, in presence of two witnesses.

LON. D. LAMKIN.

Witnesses:
T. E. MERRIMAN,
F. M. ACORD.